(12) United States Patent
Klesing

(10) Patent No.: US 6,605,911 B1
(45) Date of Patent: Aug. 12, 2003

(54) DRIVE DEVICE AND METHOD FOR MOVING A VEHICLE PART

(75) Inventor: Joachim Klesing, München (DE)

(73) Assignee: Webasto Dachsysteme GmbH, Stockdorf (DE)

( * ) Notice: Subject to any disclaimer, the term of this patent is extended or adjusted under 35 U.S.C. 154(b) by 0 days.

(21) Appl. No.: 09/786,391

(22) PCT Filed: Sep. 3, 1999

(86) PCT No.: PCT/EP99/06511
§ 371 (c)(1),
(2), (4) Date: Jun. 1, 2001

(87) PCT Pub. No.: WO00/14846
PCT Pub. Date: Mar. 16, 2000

(30) Foreign Application Priority Data

Sep. 3, 1998 (DE) .......................... 198 40 163

(51) Int. Cl.⁷ ................................ H02P 1/00
(52) U.S. Cl. ................ 318/286; 318/256; 123/361
(58) Field of Search ................ 318/256, 286, 318/264, 265, 266, 283; 388/907.5; 123/361

(56) References Cited

U.S. PATENT DOCUMENTS 5,404,673 A * 4/1995 Takeda et al. .............. 318/266
5,483,135 A * 1/1996 Parks ......................... 318/281
5,530,329 A * 6/1996 Shigematsu et al. ........ 318/469
5,610,484 A * 3/1997 Georgin ...................... 318/286

FOREIGN PATENT DOCUMENTS

| DE | 29 26 938 | 1/1981 |
| DE | 40 00 730 | 8/1991 |
| DE | 43 12 865 | 11/1993 |
| DE | 42 34 501 | 12/1995 |
| DE | 41 09 867 | 5/1996 |
| DE | 196 18 219 | 11/1997 |
| DE | 196 37 631 | 4/1998 |
| WO | WO 92/20891 | 11/1992 |

* cited by examiner

Primary Examiner—Mahmoud Gimie
(74) Attorney, Agent, or Firm—Nixon Peabody LLP; David S. Safran

(57) ABSTRACT

A process for adjusting a motor vehicle part between at least two positions and a drive device for executing this process. The motor vehicle part is driven by an electric motor. A pulse signal is generated according to the rotary motion of the electric motor (10) and is supplied to a control unit (24) for controlling the electric motor (10). The instant of input of each signal on the control unit (24) is acquired and between two such input instants at certain extrapolation instants from at least some of these measured instants the current force acting on the motor vehicle part is estimated, this estimate being used as the criterion in the decision whether the electric motor (10) is turned off or reversed or not.

32 Claims, 4 Drawing Sheets

DRIVE DEVICE AND METHOD FOR MOVING A VEHICLE PART

BACKGROUND OF THE INVENTION

1. Field of the Invention

The invention relates to a drive device for a motor vehicle part which can be adjusted between at least two positions and a process for adjusting a motor vehicle part between at least two positions.

2. Description of Related Art

DE 43 21 264 A1 discloses a drive device in which an electric motor drives a motor vehicle window pane. By means of two Hall sensors which are offset by 90 degrees and which interact with a magnet located on the motor shaft a signal is produced from which the instantaneous period duration of a motor revolution and thus the instantaneous motor rpm are determined at each time at which one such signal enters a control unit for controlling the motor. As soon as the instantaneous rpm change resulting from the difference of two successive rpm measured values exceeds a stipulated threshold value the motor is reversed in order to release a possibly pinched article.

DE 195 11 581 A1 discloses a similar drive device in which however the threshold value is variably chosen depending on the position, a memory for certain positions of the adjustment path storing the speed change acquired in an earlier run between two adjacent positions, in order to compute therefrom as a function of position depending on the last currently acquired position and speed the shut-off threshold for the speed.

DE-OS 29 26 938 discloses acquiring the motor rpm in a sliding roof drive at uniform time intervals, finding the differences of successive values, adding these differences to one another when they are larger than a predetermined threshold value, and triggering the shut-off or reversal of the motor as soon as the added sum exceeds a predetermined threshold value.

DE 43 12 865 A1 discloses a drive device for a motor vehicle window which acquires the motor rpm by means of two Hall detectors, and which when a threshold is exceeded for the relative change of rpm reverses the motor. In doing so the threshold value is continually recomputed depending on the acquired motor voltage and the ambient temperature which is determined by a temperature sensor on the motor. In doing so the status/operating times of the motor are considered in order to be able to draw conclusions about the ambient temperature from the motor temperature.

DE 196 18 219 A1 discloses determining the rpm threshold or the rpm change threshold of the motor, starting from which reversal of the motor takes place, from the position-dependent rpm data of a reference run which has taken place beforehand depending on the position of the cover for a sliding roof drive.

The defect in these drive devices which acquire the rpm is that between two signals for acquiring the period or the motor rpm the pinching protection is not effective and under certain circumstances pinching of an article is only recognized with a delay; this leads to an increased pinching force and thus to damage to the actuation mechanism of the adjustable motor vehicle part or to injury to pinched body parts.

DE 195 14 954 A1 discloses a drive device for a motor vehicle window which acquires the motor current and moreover acquires the window position by means of Hall sensors in the motor and when the threshold value is exceeded for the motor current as a function of the window position reverses the motor.

The disadvantage in these drive devices which acquire the motor current is that additional electronic components are necessary for acquiring the motor current.

The object of this invention is to devise a drive device for a motor vehicle part which can be moved between at least two positions and a process for adjusting a movable motor vehicle part between at least two positions, by which pinching of an article is prevented without additional components.

This object is achieved in accordance with the invention by a process and by a drive device as described below.

The object of this invention is to devise a drive device for a motor vehicle part which can be moved between at least two positions and a process for adjusting a movable motor vehicle part between at least two positions, by which prompt acquisition of pinching of an article is acquired without additional components.

SUMMARY OF THE INVENTION

This object is achieved as claimed in the invention by a process as claimed in claim 1 and by a drive device as claimed in claim 29.

In this approach in accordance with the invention, it is advantageous that by the pinching protection is also active between two signals, i.e., between two measured values, without additional cost, as is necessary, for example, in the motor current acquisition, and thus, can react very promptly to cases of pinching.

Preferably the extrapolation instants have a fixed time interval.

Preferably spring strengths, damping and friction of the drive device are considered in determining the action of the force. The triggering threshold can be placed lower by this modelling of the system.

Furthermore, it is preferably provided that the estimated rpm change results from the difference of the period duration estimated for the extrapolation instant and the period duration estimated for the preceding extrapolation instant, the period duration which has been estimated for each extrapolation instant resulting as the sum from the last measured period duration and the parameter-weighted sum of several period durations measured before the last measured period duration, the latter sum being multiplied by the time which has passed since the last measurement.

Preferably only the last three of the measured values of the period duration preceding the last measurement before the extrapolation instant are considered. This is sufficient for satisfactory function.

Preferably the force acting on the motor vehicle part is determined by each estimated rpm change being multiplied by a proportionality factor and the values obtained in this way being added up as soon as the estimated rpm change exceeds a lower threshold value. In this way the effect of small rpm changes is reduced; this increases the triggering accuracy.

In the preferred embodiment of the invention it is furthermore provided that when the estimated rpm change exceeds an upper threshold value, instead of the estimated rpm change only the upper threshold value becomes part of the summation. In this way faulty triggering of the pinching protection by the effects of vibration is prevented.

The upper threshold value is chosen preferably differently depending on the last determined rpm change value. In this way the triggering accuracy can be further increased.

Furthermore the control unit is preferably made such that the proportionality factor for determining the force change from the rpm change is chosen depending on the motor characteristic which is determined before start-up without the driven motor vehicle part for at least one motor voltage. In this way better modelling of the individual system is achieved so that the triggering threshold can be set lower.

One advantageous development furthermore consists in that parallel to determining the estimated value of the current action of force in at least one second independent computation from the acquired pulse signals at certain second instants a second value for the current force action on the motor vehicle part is determined, the second value being used as an additional criterion in the decision whether the motor is turned off or reversed or not. This has the advantage that the first and the second computation can be optimized for pinching processes or force changes of different speeds; this further increases the triggering accuracy.

Preferably at certain times spectral analysis of the rpm changes estimated or determined within a certain time window up to the analysis point is done, the motor only being turned off or reversed when the determined spectrum meets certain requirements. This protects against faulty triggering under conditions of vibration.

DETAILED DESCRIPTION OF THE INVENTION

Figure 1:
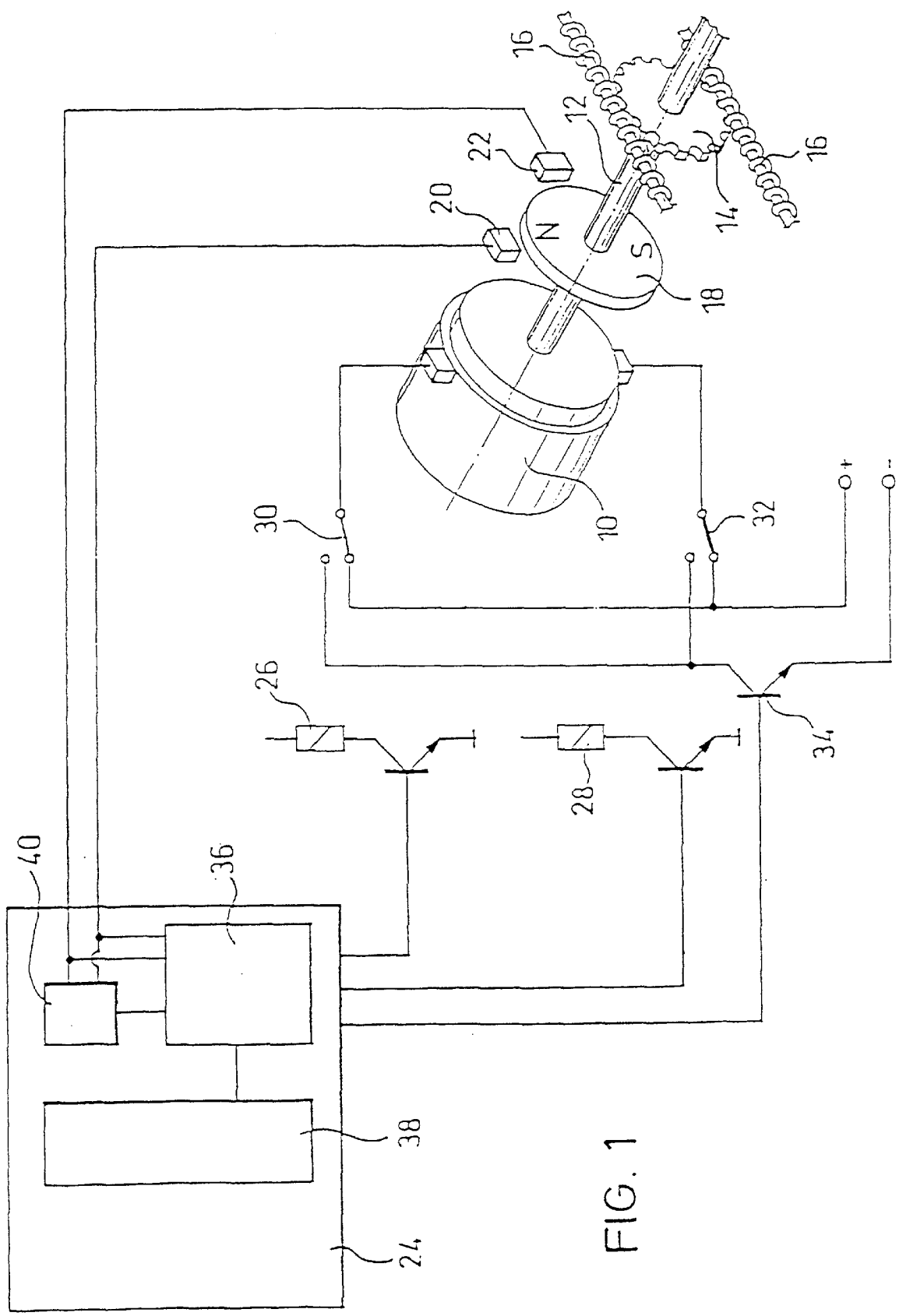
FIG. 1 shows a schematic of a drive in accordance with the invention.
Figure 4:
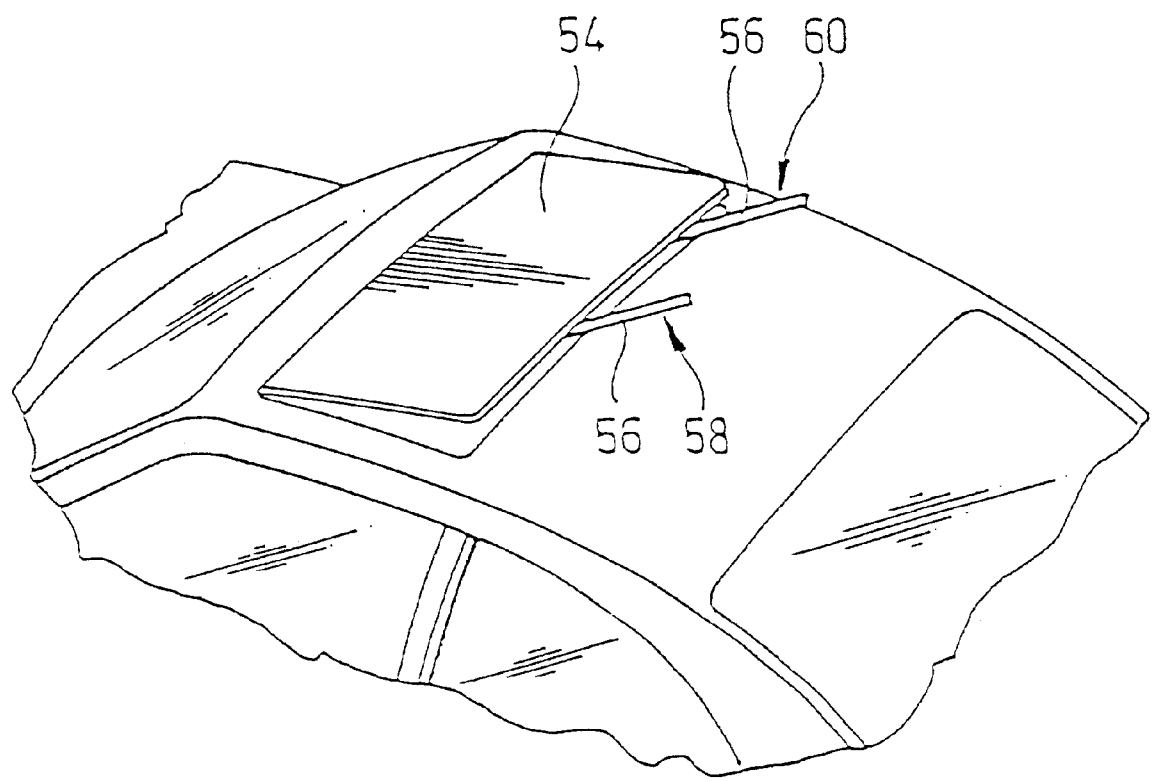

With reference to FIG. 1, an electric motor 10, which is made as a DC motor, via a shaft 12, drives a pinion 14 which engages two drive cables which are guided to be resistant to tension and compression. Between the electric motor 10 and the pinion 14, there is optionally another worm gear pair which is not shown. The movable covers 54 of the sliding motor vehicle roofs currently mostly made as sliding and lifting roofs, or spoiler roofs, are generally driven by means of these drive cables 16. The window raisers of a motor vehicle door often act via a cable drum and a smooth cable on the movable part, i.e.,the window. It is irrelevant for the following examination how the force is applied to the movable motor vehicle part. Preferably, the cover 54 of a sliding and lifting roof, which however for the sake of better clarity is only shown in FIG. 4,is driven.

A magnet wheel 18 with at least one south pole and one north pole is mounted torsionally strong on the shaft 12. Of course there can also be several, for example four north poles and four south poles, on the magnet wheel 18, by which the period duration of the signals is shortened accordingly. In the peripheral direction offset by roughly 90 degrees near the magnet wheel 18 there are two Hall sensors 20, 22 which each deliver a pulse signal for each passage of the north and south pole of the magnet wheel 18 to a control unit 24 which is provided with a microprocessor 36 and a memory 38 and which thus receives a signal for roughly each quarter revolution of the shaft 12. The period duration results from the interval of two successive signals on the same sensor 20 and 22 which are part of the interval of one complete revolution of the shaft 12. Due to the 90 degree arrangement of the two sensors 20, 22 the period duration is computed alternatingly from the time difference of the last two signals on the sensor 20 and 22 so that for each quarter revolution a new value of the period duration is available. By this type of determining the period duration, deviations from the exact 90 degree geometry of the sensor arrangement have no effect on the period duration, as would be the case when the period duration is determined from the time difference between the last signal of one sensor and of the other sensor.

As a result of the phase shift of the signals of the two sensors 20, 22 the direction of rotation can also be determined. In addition, the current position of the cover 54 can be determined from the signals of the Hall sensors 20, 22 by these signals being supplied to a counter 40 which is assigned to the control unit 24.

The direction of rotation of the electric motor 10 can be controlled by the control unit 24 via two relays 26, 28 with reversing contacts 30, 32. The rpm of the motor 10 are controlled by pulse width modulation via a transistor 34 which is triggered by the control unit 24.

From the instant of signal input from the Hall sensors 20 and 22 the microprocessor 36 determines the instantaneous period duration of the revolution of the shaft 12 and thus of the electric motor 10. Thus roughly for each quarter turn of the shaft 12 a measured value for the period duration is available. To ensure pinching protection between these instants as well, estimated values for the period duration are continuously extrapolated in a fixed time reference, for example after each 1 ms, from preceding measured values of the period duration, for example according to the following formula $$T^*[k]=T[i]+k\cdot(a1\cdot T[i-1]+a2\cdot T[i-2]+a3\cdot T[i-3]) \quad (1)$$

a1, a2, a3 being parameters, i being an index which for each signal input, i.e. for each quarter period, is incremented, and k being the running index of the fixed time reference which is reset to zero for each new measured value for the period duration. Instead of the last four measured values, depending on the requirement, also more or fewer measured values can be considered, for example only the last two.

Figure 2:
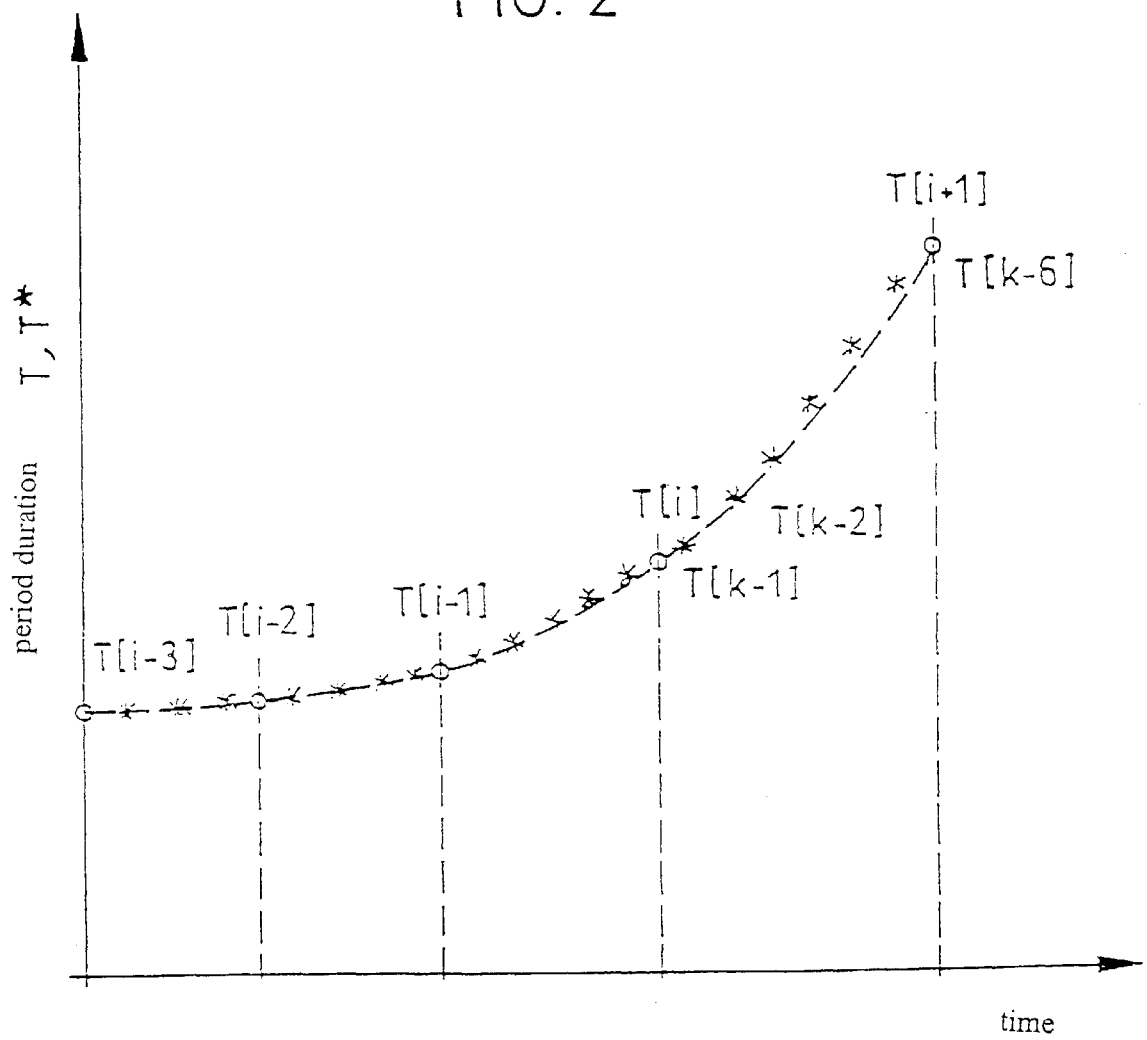
FIG. 2 shows a graphic representation of a sample time behavior of the period duration of a motor revolution.

The parameters a1, a2, a3 model the entire system of the drive device, i.e. the motor 10, the force transmission components and the cover, and are determined by the spring stiffnesses, damping and friction of the entire system. This yields bandpass action with the property that spectral portions of the period time behavior caused by vibrations are evaluated more weakly than those originating from a case of pinching. FIG. 2 schematically shows the sample time behavior of the measured period durations T and the period durations T* which have been estimated therefrom. The broken-line curve represents the true behavior of the period duration.

From the estimated values for the period duration which have been determined in this way, then the rpm change at time [k] relative to the preceding instant [k−1] is estimated, a motor voltage filter and a path profile filter being used to eliminate the effects of the motor voltage and the position at which the movable motor vehicle part, i.e. the cover, is in fact located, on the motor rpm, the following formula being used $$N^*[k]=(T^*[k]-T^*[k-1])/(T^*[k])^2-Vu(Um[k])-Vr(x[k]) \quad (2)$$

Um[k] being the motor voltage at time [k], Vu being the motor voltage filter which simulates the relationship between the rpm and the motor voltage which has been acquired by the control unit 24, x[k] being the position of the cover at time [k] and Vr being a path profile filter which simulates the relationship between the motor rpm and the position of the cover.

The motor voltage filter Vu simulates the dynamic behavior of the motor for voltage changes. Preferably the motor voltage filter Vu is made as a lowpass filter with a time constant which is equal to the motor time constant. The time constant is dependent on the operating case, i.e. on the opening or closing of the cover 54 in the sliding or lowering direction, and on the magnitude of the voltage change.

The path profile filter Vr is automatically determined by a learning run after the drive device is installed. The position of the cover 54 is, as mentioned above, determined from the pulse signals of the Hall sensors 20, 22 which are added up by means of the counter 40.

The decision whether a case of pinching is present or not is made using the following formula:

$$(Vf \cdot \_N^*[k]) = (\_F[k]) > F\max \qquad (3)$$

The estimated rpm changes $\_N^*[k]$ are compared to a fixed, time-constant lower boundary. As soon as they exceed this lower boundary, they are each multiplied by a proportionality factor Vf which reproduces the steepness of the motor characteristic of the electric motor 10 (torque over rpm). At a constant motor voltage and motor temperature the steepness is roughly constant, but for each electric motor 10 it is individually different. To eliminate these effects, on the one hand a temperature sensor acquires the ambient temperature and the motor temperature is approached via the acquisition of the operating duration (instead the ambient temperature can also be directly acquired by a temperature sensor on the electric motor 10). On the other hand, for each electric motor 10 before connection to the cover 54 within the framework of the final production check at a constant motor voltage two pairs of values for rpm and torque are determined and stored in a memory 38. From these measured values the rise of the motor characteristic is determined, from which the proportionality factor Vf is computed.

The product of $\_N^*[k]$ and Vf corresponds to the change $\_F[k]$ of the force acting on the displacement motion of the cover 54 at time [k] relative to the instant [k−1].

The values of $\_F[k]$ are added up as long as the values of $\_N^*[k]$ are above the fixed lower boundary. As soon as two successive $\_N^*[k]$ values are again below it, the sum is set to zero. If the $\_N^*[k]$ value exceeds a fixed upper boundary, in place of this $\_N^*[k]$ only the value of the upper boundary is included in the sum. This is used to eliminate as much as possible the effects of vibrations which lead to brief periodic peaks of the rpm change on the recognition of a case of pinching. This upper boundary can be chosen to be constant in the simplest case. In order to increase the accuracy of triggering, however the upper limit can also be chosen differently in time depending on the currently determined rpm change, for example in the form that the upper limit is raised as the current rpm change rises.

As soon as the sum of $\_F[k]$ exceeds a maximum allowable pinching force Fmax, the control unit 24 by triggering the relays 26, 28 via the switches 30, 32 initiates reversal of the electric motor 10 in order to again immediately release the pinched article or the pinched body part.

Thus the pinching protection is also active due to the described extrapolation of the period durations between the two measured values of the period duration at fixed instants, by which a case of pinching can be recognized earlier, i.e. at a lower pinching force; this better prevents damage or injuries and thus increases the safety of the drive device.

To further reduce the probability of faulty activation when vibrational forces occur, spectral analysis of the rpm changes determined within a certain time window up to the analysis instant can be undertaken. When certain spectral characteristics occur, especially when a clearly pronounced peak occurs which is not in the spectral range typical for cases of pinching, triggering is prevented even if the threshold Fmax is exceeded.

Figure 3:
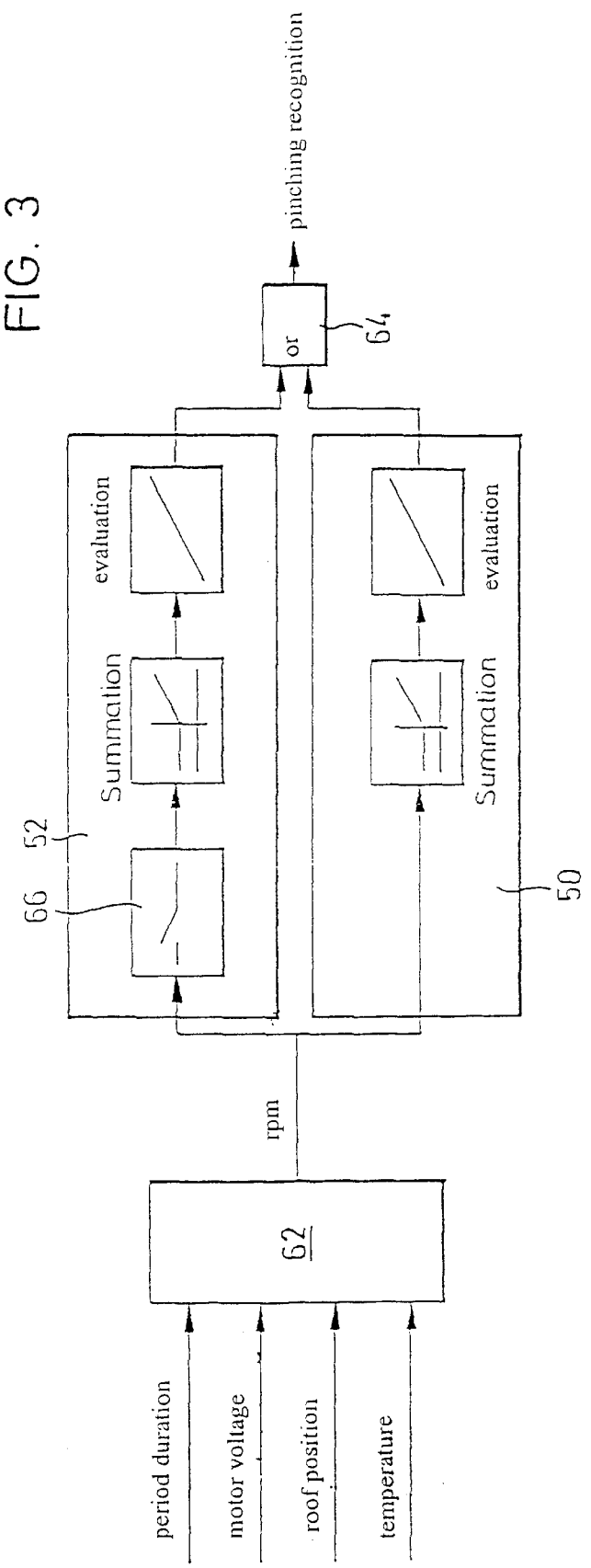
FIG. 3 shows a schematic of one embodiment of the process in accordance with the invention for determining a case of pinching, and FIG. 4 schematically shows a motor vehicle roof for illustration of the process as shown in FIG. 3.

FIG. 3 schematically shows a second embodiment of the invention. The major difference from the above described first embodiment is that parallel and independently of the extrapolation of the measured period durations in accordance with the invention at certain times and of the determination of estimated values for the force acting on the adjustable motor vehicle part in a first computation 50, a second computation 52 is carried out with its own set of parameters and with a different scanning rate which likewise delivers the value for the instantaneous action of the force. For the decision whether the motor is to be turned off or reversed, the results of the two computations are considered in a logic stage 54 in the form of an OR gate. This results from the following considerations.

The stiffness of the entire system is composed of the stiffnesses of the sliding and lifting roof mechanism, of the pinched body, and of the motor vehicle body. On the one hand the stiffness of the pinched body depends on the type of body. On the other hand the stiffness of the body depends largely on the location at which the body is pinched. This applies especially in the lowering motion of the cover 54 from a raised position, see FIG. 4. If in doing so a body 56 is pinched in the area of the middle of the roof (indicated in FIG. 4 at 58) the entire system based on the possible deflection of the rear edge of the cover is much softer than for pinching in the edge area (indicated in FIG. 4 at 60).

The scanning rate is hereinafter defined as the interval of the instants at which the value for the instantaneous action of the force is determined. If the system is working with a single fixed scanning rate, the set of parameters of the computation, especially the threshold values or the boundary values, and the selected scanning rate can be optimized only for a single stiffness of the entire system, but in practice depending on the type and location of the pinched body different stiffnesses of the entire system can be decisive.

By carrying out a second parallel computation 52 it is possible to optimize this second computation 52 for another stiffness by the corresponding choice of the computation parameters and the scanning rate underlying the computation, i.e. the choice of the instants at which a new value of the instantaneous action of force is computed.

The second computation 52 is preferably optimized for acquisition of slow changes of the action of force, i.e. small stiffnesses, while the first computation 50 is optimized for the acquisition of fast changes of the action of force, i.e. high stiffnesses.

Generally, in the secondary computation 52 it is not necessary to extrapolate the measured values of the period duration, but depending on the relevant stiffness range, in any case after input of a new measured value or only after each n-th input of the measured value, the computation 52 of the new value of the instantaneous action of force is done. But basically, if necessary, the second computation 52 can use an extrapolation algorithm, the extrapolation instants being chosen at a greater interval than in the first computation 50.

As shown in FIG. 3, in the rpm acquisition stage 62, from the input values period duration T, motor voltage, cover position x and motor temperature according to the aforementioned formulas (1) and (2) with the first (higher) scanning rate, i.e. at the measurement instants [i] and the extrapolation instants [k], the current rpm change _N* or the current rpm N* is determined (this results from N*[k]=1/T*[k]-Vu(Um[k])-Vr(x[k]; instead of [k], there can also be [i]). Furthermore the motor temperature when determining the rpm in the conversion from the change in rpm to the change in force is taken into account according to equation (3). The first scanning rate is chosen such that it is optimum for acquisition of cases of pinching with the highest system stiffnesses to be expected. The rpm acquisition stage 62 is used jointly by the first computation 50 and the second computation 52.

In the first computation 50, it is ascertained from the rpm change _N* by means of the formula (3) in the aforementioned manner using the first value for the fixed lower boundary, the first value for the fixed upper boundary, and the first value for the threshold value Fmax at the instants which have been established by the first scanning rate, i.e. the extrapolation instants [k], whether the instantaneous action of the force exceeds this first threshold value Fmax. The values of this first parameter set are optimized for the acquisition of cases of pinching with the largest system stiffness to be expected.

In the second computation 52 the scanning rate is chosen such that it is optimum for acquisition of cases of pinching with the lowest system stiffnesses to be expected. This second scanning rate can be chosen for example such that only each fourth measured value of the period duration T is considered. In this case the second computation is done only for each fourth signal input from the Hall sensors 20, 22, i.e. only each fourth rpm N[i] which is determined by the stage 62 and which goes back to the measured period duration T is considered in the scanning stage indicated at 66 in FIG. 4. The rpm N*[k] which have been determined from the extrapolated period durations T* are of course ignored anyway. The second computation 52 is therefore carried out only at each fourth instant [i].

First, the change of rpm _N[i] is determined relative to the last measured value. Then, analogously, by means of the equation (3) using a second value for the fixed lower boundary, a second value for the fixed upper boundary, and a second value for the threshold value Fmax it is established whether the instantaneous action of force exceeds this second threshold value Fmax. The values of this second parameter set are optimized for acquisition of cases of pinching with the smallest system stiffness to be expected.

For the decision whether there is a case of pinching, i.e. the motor is to be turned off or reversed, the results of the first and the second computation are logically combined with one another in the logic stage 64. In the simplest case it is an OR operation. In this case therefore the motor is turned off or reversed when one of the two computations has acquired a case of pinching. The decision is made at each instant at which the first computation 50 delivers a new result. Since new results of the second computation 52 are present much more rarely, the last result of the second computation 52 is supplied to the logic stage 64.

Both fast and soft changes of the action of the forces can be optimally acquired by the combination of the results of the two computations 52, 54.

What is claimed is:

1. Process for adjusting a motor vehicle part between at least two positions, the motor vehicle part being driven by an electric motor, furthermore a pulse signal being generated proportionally to the rotary motion of the electric motor and being supplied to a control unit for controlling the electric motor, the instant of input of each signal to the control unit being acquired and at certain extrapolation instants between two such input instants, the current force acting on the motor vehicle part being estimated from at least some of these measured instants and ultimately this estimate being used as the criterion in the decision whether the electric motor is turned off or reversed or not, upon the input of a new pulse signal, the measured value of the current period duration of the motor revolution being determined from the difference relative to at least one earlier pulse signal measured value, an estimate of the current period duration being determined at each extrapolation instant with consideration of the current measured period duration and at least one of the previous measured period durations, furthermore the estimated current rpm change being determined from the estimated period durations, and the estimate of the current force acting on the motor vehicle part being determined from the estimated changes of rpm.

2. Process as claimed in claim 1, wherein the extrapolation instants have a fixed time interval.

3. Process as claimed in claim 1, wherein the estimated rpm change results from the difference of the period duration which has been estimated for the extrapolation instant and the period duration which has been estimated for the preceding extrapolation instant, the period duration which has been estimated for each extrapolation instant resulting as the sum from the last measured period duration and the parameter-weighted sum of several period durations measured before the last measured period duration, the latter sum being multiplied by the time which has passed since the last measurement.

4. Process as claimed in claim 3, wherein the parameters are chosen according to the spring stiffnesses, damping and friction of the adjustment system.

5. Process as claimed in claim 4, wherein the parameters are chosen such that a bandpass action arises of the type that error recognition of a case of pinching as a result of vibrations is avoided.

6. Process as claimed in claim 1, wherein only the last three of the measured values of the period duration preceding the last measurement before the extrapolation instant are considered in the sum.

7. Process as claimed in claim 1, wherein the motor voltage is acquired and when the change of rpm is estimated, a motor voltage filter is used which simulates the dynamic behavior of the electric motor for voltage changes.

8. Process as claimed in claim 7, wherein the motor voltage filter is made as a lowpass filter with a time constant which is equal to the motor time constant.

9. Process as claimed in claim 1, wherein the position of the motor vehicle part is determined and when the change of rpm is estimated, a path profile filter is used which simulates the friction forces in the drive for the motor vehicle part as a function of the position of the motor vehicle part.

10. Process as claimed in claim 9, wherein the path profile filter is automatically determined by a learning run after the drive device is installed in the motor vehicle.

11. Process as claimed in claim 1, wherein the force acting on the motor vehicle part is determined by each estimated rpm change being multiplied by a proportionality factor and the values obtained in this way being added up as soon as the estimated rpm change exceeds a lower threshold value.

12. Process as claimed in claim 11, wherein, when the estimated rpm change exceeds an upper threshold value, instead of the estimated rpm change, only the upper threshold value becomes part of the summation.

13. Process as claimed in claim 12, wherein the upper threshold value is variable.

14. Process as claimed in claim 13, wherein the upper threshold value is chosen as a function of at least some of the determined values of the change of rpm.

15. Process as claimed in claim 14, wherein the upper threshold value is chosen as a function of the last determined value of the change of rpm.

16. Process as claimed in claim 11, wherein the proportionality factor is chosen as a function of the motor characteristic.

17. Process as claimed in claim 16, wherein the motor characteristic before start-up without coupling to the driven motor vehicle part is determined for at least one motor voltage.

18. Process as claimed in claim 17, wherein the motor characteristic is determined by measuring two pairs of values of rpm and torque at a constant motor voltage.

19. Process as claimed in claim 11, wherein the proportionality factor is chosen as a function of the motor temperature.

20. Process as claimed in claim 19, wherein the motor temperature is estimated by the ambient temperature and the length of operation of the electric motor being acquired.

21. Process as claimed in claim 1, wherein the motor is shut off or reversed by the control unit as soon as the estimated value of the current action of force exceeds a predetermined trigger threshold.

22. Process as claimed in claim 1, wherein, parallel to determining the estimated value of the current force actions in at least one second independent computation, from the acquired pulse signals at certain second instants, a second value for the current force acting on the motor vehicle part is determined, the second value being used as an additional criterion in the decision whether the motor is turned off or reversed or not.

23. Process as claimed in claim 22, wherein it is determined whether the estimated value of the current action of force exceeds a given trigger threshold or whether the second value determined from the second computation for the action of force exceeds a given second trigger threshold.

24. Process as claimed in claim 23, wherein the results of the two comparisons are combined in an OR operation.

25. Process as claimed in claim 22, wherein the second computation is optimized for recognition of slow changes of the action of the force.

26. Process as claimed in claim 25, wherein in the second computation extrapolation does not take place, but a new value of the action of force is computed at maximum only after the input of a new pulse signal.

27. Process as claimed in claim 26, wherein, in the second computation, a new value of the action of force is computed only after each n-th input of a pulse signal.

28. Process as claimed in claim 1, wherein the motor vehicle part is the cover or a cover part of an openable motor vehicle roof.

29. Drive device for a motor vehicle part which can be moved between at least two positions, with an electric motor for driving the motor vehicle part and a means for producing a pulse signal according to rotary motion of the motor, which signal is supplied to the control unit for controlling the electric motor the control unit being made such that the instant of input of each signal on the control unit is acquired, and between two such input instants, the current force acting on the motor vehicle part is estimated from at least some of the measured instants at certain extrapolation instants and is used as the criterion for determining whether the electric motor is turned off or reversed or not.

30. Drive device as claimed in claim 29, wherein the control unit is made to execute a process wherein the extrapolation instants have a fixed time interval.

31. Drive device as claimed in claim 29, wherein the pulse signal generation means comprises a magnet wheel mounted on the shaft of the electric motor, with a radial north pole and a south pole and two Hall sensors which are offset by roughly 90 degrees in the peripheral direction and which are arranged around the magnet wheel.

32. Drive device as claimed in claim 31, wherein the control unit is made such that the measured period durations are each determined from the time difference of the last two signals of the sensor which delivered the last signal.

* * * * *